(12) United States Patent
Gupta et al.

(10) Patent No.: US 7,254,577 B2
(45) Date of Patent: Aug. 7, 2007

(54) METHODS, APPARATUS AND COMPUTER PROGRAMS FOR EVALUATING AND USING A RESILIENT DATA REPRESENTATION

(75) Inventors: Rahul Gupta, New Delhi (IN); Sachindra Joshi, New Delhi (IN); Raghuram Krishnapuram, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 429 days.

(21) Appl. No.: 10/880,141

(22) Filed: Jun. 29, 2004

(65) Prior Publication Data

US 2006/0026157 A1 Feb. 2, 2006

(51) Int. Cl.
*G06F 17/30* (2006.01)
(52) U.S. Cl. ............................ 707/6; 707/2; 707/101; 715/513
(58) Field of Classification Search ................ 707/101, 707/6
See application file for complete search history.

(56) References Cited

U.S. PATENT DOCUMENTS

| | | | | |
|---|---|---|---|---|
| 6,301,870 | B1 * | 10/2001 | Bunger et al. ............... | 57/290 |
| 6,516,308 | B1 * | 2/2003 | Cohen ......................... | 706/12 |
| 7,035,841 | B2 * | 4/2006 | Chidlovskii .................. | 707/2 |
| 7,107,524 | B2 * | 9/2006 | Lin et al. ..................... | 715/513 |
| 2001/0042067 | A1 * | 11/2001 | Dayani-Fard et al. ....... | 707/102 |

OTHER PUBLICATIONS

Kushmerick, Nicholas. Regression Testing for Wrapper Maintenance, Proceedings of the 16th National Conference on Artificial Intelligence and the 11th Innovative Applications of Artifical Intelligence Conference, Orlando, Florida, Jul. 18-22, 1999. American Assoc. for Artifical Intelligence.*

Yoon, Jong and Vijay Raghavan. Multi-level Schema Extraction for Heterogeneous Semi-Structured Data, Lecture Notes in Computer Science: vol. 1846, Proceedings of the First International Conference on Web-Age Information Management, 2000.*

(Continued)

*Primary Examiner*—Jeffrey Gaffin
*Assistant Examiner*—Christyann Pulliam
(74) *Attorney, Agent, or Firm*—Gibb & Rahman, LLC; Andrew P. Tennent, Esq.

(57) ABSTRACT

Provided are methods, apparatus and computer programs for evaluating the resilience, to structural changes in a data source, of a representative label representing a data element within the data source. Also disclosed are applications using a resilient representative label. For example, a representative label may represent a particular data field or other data element within a semi-structured data source—such as within XML or HTML Web pages. An estimate of resilience to changes can be used to determine whether a candidate representative label satisfies a required degree of resilience, or to enable selection of a label with the highest resilience score among a set of representative labels. The validated or selected representative label may then be used for data extraction, remaining usable despite the possibility of future changes to the structure of a Web page, or for template clustering/classification.

21 Claims, 4 Drawing Sheets

OTHER PUBLICATIONS

H. Davulcu, G. Yang, M. Kifer and I.V. Ramakrishnan, "Computational Aspects of Resilient Data Extraction from Semi-structured Sources" *Proceedings of 19th ACM SIGMOD symposium on Principles of Database Systems (PODS)*, 2000, pp. 136-144. Dallas, Texas, US.

Yang Li, Zhan Cui, Hongji Yang, Hewijin C. Jiau, "Tolerating Changes in A Design Psychology Based Web Page Wrapper", *Proceedings of 26th Annual International Computer Software and Applications Conference*, Aug. 26-29, 2002, Oxford, England.

J. Yang, E. Lee, J. Choi, "A shopping agent that automatically constructs wrappers for semi-structured online vendors", *Intelligent Data Engineering and Automated (IDEAL) 2000, Data Mining, Financial Engineering, and Intelligent Agents, Second International Conference, Proceedings* (Lecture Notes in Computer Science vol. 1983), pp. 368-373, Berlin, Germany, 2000.

\* cited by examiner

METHODS, APPARATUS AND COMPUTER PROGRAMS FOR EVALUATING AND USING A RESILIENT DATA REPRESENTATION

FIELD OF INVENTION

The present invention relates to methods, apparatus and computer programs for evaluating and using a resilient data representation in a data processing environment that is subject to change. The invention may be applied to identify, verify or select a data representation that is resilient to structural changes in the data that it represents, for applications such as classification, storage management and data extraction.

BACKGROUND

Several methods have been proposed for extracting data from semi-structured documents—documents which do not have a completely regular and static structure. For example, methods are known for extracting required data from Internet Web sites using "wrappers" (specialized computer program routines that automatically extract data from the Web sites). According to some estimates, over 80% of the published information available via the Web (i.e. the World Wide Web Internet service) is based on databases that run in the background. The structure of the underlying database is lost in the process of generating HTML pages. Wrappers try to reverse this process by extracting relevant data from HTML pages and reconstructing the structure—mapping the HTML source to a set of semi-structured (or structured) database objects that can be queried and manipulated by applications.

Most wrapper-based methods represent Web pages as a sequence of tokens that include strings and HTML tags. The methods then involve constructing a representative label for the desired data elements. The representative label provides a way to identify desired data within a given document based on the structure of the document. These representative labels can be created either manually or semi-automatically via a graphical user interface.

The representative labels of relevant data fields can also be used as characteristic features of a document and a classification algorithm can be used to classify the documents in a given document collection based on such features.

The Web is extremely dynamic and continually evolving, such that there are frequent changes in the structure and content of Websites and documents. A commercial Web site may be updated to apply new Web page design techniques, to add a description of new product features, to change the page layout, or to correct errors. Consequently, representative labels that use specific structural information relating to a document (such as specifying the location of information within a page) must be updated regularly in order to maintain the desired functionality of conventional wrappers. However, updating the labels is a cumbersome and time consuming process.

Davulcu et al in "Computational Aspects of Resilient Data Extraction from Semi-structured Sources", Proceedings of $19^{th}$ ACM SIGMOD Symposium on Principles of Database Systems (PODS), 2000, Dallas, Tex., US, pages 136-144, present a formal framework for creating resilient data extraction wrappers for semi-structured data. They propose the notion of extraction expressions which are tag-marked regular expressions and are used to identify the desired data. Davulcu et al use the following two-stage strategy to find the resilient extraction expression for desired data in a document. In the first stage, several perturbations to the given document are made and extraction expressions for the desired data in all perturbations are determined. In the next step, Davulcu et al try to generalize these extraction expressions into a single extraction expression that matches all the perturbed instances of the document. Davulcu et al further introduce the notion of "unambiguity" as a consistency requirement for the generalized extraction expression.

The method disclosed by Davulcu et al considers a specific set of perturbed pages—apparently relying on the assumption that checking "unambiguity" of a generalized extraction expression for a specific class of perturbations will provide an acceptable resilient extraction expression. This is not always the case in practice. Davulcu et al mention other limitations of their techniques, and express uncertainty regarding whether maximisation of resilience can be determined.

SUMMARY

A first embodiment of the present invention provides a method for evaluating the resilience, to structural changes in a data source, of a representative label representing a data element within the data source. This 'resilience' relates to the label's ability to continue correctly identifying a targetted data element following structural changes. There may be additional resilience criteria such as whether the label is likely to match extraneous data as well as the data elements of interest. The resilience may be evaluated by estimating a probability of the representative label satisfying a set of resilience criteria following possible structural changes within the data source.

A representative label is an identifier of one or more data elements by reference to the structure of the data source—such as the data elements' location within a Document Object Model (DOM) tree representing the data source. For example, the representative label may represent a particular data field within a semi-structured data source—such as within XML, HTML Web pages or a document in any language that is a variant of SGML. Although the data elements of interest may be data fields within a Web page or other document, the term 'data elements' as used herein encompasses structural features and attributes other than fields.

The data within a semi-structured document such as an HTML page has some elements of structure, but the structure is not entirely regular and is subject to change. An estimate of resilience to changes can be used to determine whether a candidate representative label satisfies a required degree of resilience, or to enable selection of a label with the highest resilience score among a set of representative labels. The validated or selected representative label may be used to enable future data extraction, despite the possibility of changes to the structure of a Web page, or for classification purposes. For example, a data extraction process may be required to obtain current stock prices or product prices from a set of Web pages. Users will want the data extraction to work successfully regardless of changes to the Web pages.

A representative label may be referred to as 'resilient' if the label correctly identifies targetted data or objects within a document despite changes to the structure of the document. For example, a change may involve addition of a leaf node to the document structure, or deletion of a subtree in the Document Object Model (DOM) tree corresponding to the structure of a given HTML page. A particular change model may encompass sequences of changes including 'addition of a leaf node', 'deletion of a sub-tree' and other changes. The number of consecutive changes to which a representative label is resilient is referred to herein as the 'degree of resilience' of the representative label (for one embodiment of the invention). More generally, the type of changes and the number of consecutive changes to which a representative label is resilient can be evaluated to determine a degree of resilience. The representative label with the highest degree of resilience is referred to herein as the maximal resilient respresentative label.

One embodiment of the invention provides a method for selecting a label for representing data elements within a semi-structured data source. For a set of candidate generalized representative labels that each represent a set of instances of a data element, an estimate is calculated of the probability of each respective candidate generalized representative label satisfying a set of resilience criteria following potential structural changes to the semi-structured data source. The estimated probabilities are compared to identify a generalized representative label having the highest probability of satisfying the resilience criteria, and the identified generalized representative label is selected to represent the set of instances of the data element. The 'probability' of satisfying a set of criteria following potential structural changes is intended to cover any prediction of the extent of conformance to the set of criteria.

Satisfaction of all criteria of a set of resilience criteria may not be a pre-requisite for a label being chosen, as the best fit to a set of criteria may be selected. The resilience-based selection may be based on a weighted combination of satisfaction probabilities for individual criteria, and the weightings may vary for different applications. For example, for some applications a zero weight may apply to all except one of the criteria (in this example, the set of criteria is effectively a single criterion).

An additional embodiment of the invention provides a method for extraction of data elements from a semi-structured data source. The method includes selecting a representative label to represent a data element within a data source. The selecting step includes evaluating a resilience of the representative label to structural changes of the data source, and comparing the result of said evaluation with a set of resilience criteria. A data extraction rule is then executed using the selected representative label to specify data to be extracted.

A further embodiment provides a method for evaluating representative labels representing data elements within a semi-structured data source, including the steps of generating a respective representative label for each of a set of identified instances of a data element within a semi-structured data source, and generating a generalized representative label that matches each of the representative labels generated for the identified instances. The method also includes the step of evaluating the resilience of the generalized representative label to structural changes of the semi-structured data source by estimating, for a set of possible structural changes to the semi-structured data source, a probability of the generalized representative label satisfying a set of resilience criteria.

The invention may be implemented to estimate the probability of matching all genuine nodes within the data structure and the probability of false positive matches, respectively, following one or more changes to a Web page. Based on these estimates, a resilience score can be calculated for a given representative label for a number of possible unit changes. That is, an embodiment of the invention evaluates representative labels according to their probability of satisfying two desired properties of a resilient representative label: the label should continue to match the desired data fields within a page (i.e. the label should match all "genuine nodes"); and the label should not be so generic that it erroneously matches extraneous data (i.e. the label should not produce any false positives).

A method according to the invention may be used to identify, validate or select a resilient representative label, to enable resilient data extraction (for example, extraction of desired Web page data despite changes to the structure of a Web page), and/or to enable resilient data classification for storage management. The method may be used to support data mining applications, such as obtaining data for controlling an electronic commerce application.

A method for the extraction of desired data from a document may involve generating a representative label (based on regular languages, context-free languages or specialized languages, for example) which is stored and subsequently used to locate the desired data in the document. The creation of one or more candidate representative labels can be performed manually or semi-automatically via a graphical user interface, such as using known techniques. A resilience estimation method according to the invention may then be performed to evaluate (verify or select) a suitable resilient label. According to this embodiment, the generation and evaluation of labels are performed as 'offline' or background tasks, with the generated resilient representative label subsequently being used for dynamic data extraction.

An additional embodiment of the present invention provides computer program code for controlling the operation of a data processing apparatus on which the program code executes, to perform a method as described above. The computer program may be made available as a program product in which the program code is recorded on a recording medium, and the computer program may be made available for transfer via a data transfer medium.

A further embodiment of the invention provides a data processing apparatus comprising a data processing unit, a data storage unit and computer program code for controlling the data processing apparatus to perform a method of evaluating representative labels that represent data elements within a semi-structured document. The computer program code includes a label generator for generating a respective representative label for each of a set of identified instances of a data element within a semi-structured document, and for generating a generalized representative label that matches each of the representative labels generated for the identified instances. The program code also includes an evaluator for estimating the probability of the generalized representative label satisfying a set of resilience criteria, for a set of possible structural changes to the semi-structured document, and for evaluating the resilience of the generalized representative label to structural changes of the semi-structured document by analyzing said estimated probability for the set of possible structural changes.

BRIEF DESCRIPTION OF DRAWINGS

Embodiments of the invention are described below in more detail, by way of example, with reference to the accompanying drawings in which.

DETAILED DESCRIPTION OF EMBODIMENTS

Figure 1:
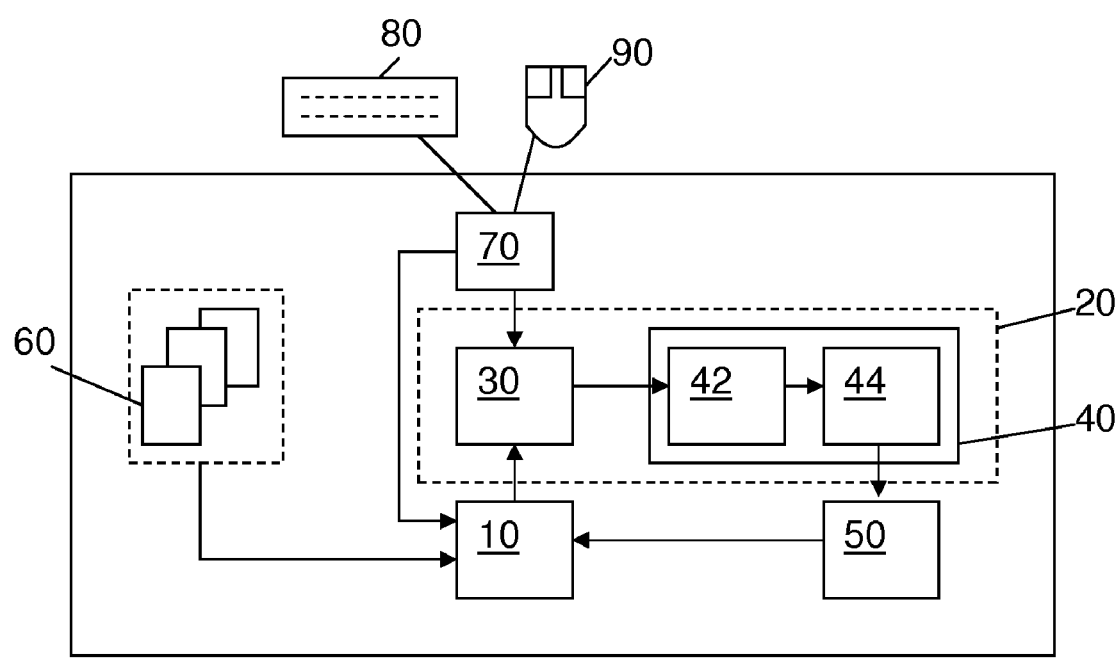
FIG. 1 is a schematic representation of a system for implementing the invention.

Described below are a method and system to identify a representative label with the highest resilience score from a set of candidate labels representing the data fields in a semi-structured document. The documents may undergo structural changes, and a resilient representative label is required to enable access to required data despite the structural changes. The resilience of a label is evaluated with respect to a known change model. Information regarding the change model may be learned from the history of previous changes to a Website or document set.

It will be apparent to a person skilled in the art that individual steps of the methods described below can be performed under the control of computer program code and that a variety of programming languages and coding implementations may be used to implement the methods and components described herein. Such computer programs are not intended to be limited to the specific example control flows described below, and steps described as if performed sequentially may be performed in parallel (and vice versa). One or more of the operations described in the context of a computer-program-controlled implementation could alternatively be performed by a hardware electronics component.

Some portions of the following description refer to 'algorithms' for performing operations on data within a computer memory. An algorithm is a self-consistent sequence of steps leading to a desired result. The steps are those requiring physical manipulations of physical quantities. Usually, these quantities take the form of electrical or magnetic signals capable of being stored, transferred, combined, compared, and otherwise manipulated. It is frequently convenient to refer to these signals as bits, values, elements, characters, numbers, or the like. It should be borne in mind, however, that the above and similar terms are to be associated with the appropriate physical quantities and are merely convenient labels applied to these quantities. Unless specifically stated otherwise, discussions within the present specification utilising terms such as "computing", "calculating", "determining", "comparing", "generating", "selecting", "outputting", or the like, refer to the action and processes of a computer system, or similar electronic device, that manipulates and transforms data represented as physical (electronic) quantities within the registers and memories of the computer system into other data similarly represented as physical quantities within the computer system memories or registers, or other such information storage, transmission or display devices.

The present specification also discloses apparatus for performing the operations of the methods, including a generalized label evaluator and other components running on a computer. Apparatus for implementing the invention may be specially constructed for the required purposes, or may comprise one or more general purpose computers or other devices selectively activated or reconfigured by computer programs stored in the computers or devices. The algorithms and methods described below are not inherently related to any particular computer hardware or other hardware apparatus. Various general purpose machines may be used with programs in accordance with the teachings herein. Alternatively, the construction of more specialised apparatus to perform the required method steps may be appropriate.

In addition, the present specification discloses a computer readable medium for storing a computer program for performing the operations of the methods. The computer readable medium is taken herein to include any transmission medium for communicating the computer program between a source and a destination. The transmission medium may include storage devices such as magnetic or optical disks, memory chips, or other storage devices suitable for interfacing with a general purpose computer. The transmission medium may also include a hard-wired medium such as exemplified by typical Internet-connected server computers, or a wireless medium such as exemplified in the GSM mobile telephone system.

Where steps or features in any of the accompanying drawings are referenced by the same reference numerals, those steps and/or features have the same or similar functions or operations in the context of the present description (unless the contrary intention appears).

For the sake of illustration, the following description relates to an example system and method in which a semi-structured document to be processed is an extensible Markup Language (XML) document. Web pages which are written in Hypertext Markup Language (HTML) can be converted into equivalent XML versions by known software tools such as Xerces, Jtidy and xml4j, so the example described below may be applied to HTML pages. After conversion to XML, the document can be referred to by reference to a tree structure, which is called the DOM (Document Object Model) tree of the document. An HTML/XML element in the original page corresponds to a node in this tree, and can be referenced by the position of the data element within the DOM tree (such as DOM tree level and index or relative position in the level) and characteristics of the data element such as features of its characteristic pattern of tokens and tags. The description below assumes that a data field instance does not span multiple nodes but corresponds to a single node in the XML document (avoiding the difficulty of defining precision and counting false positives for multi-node data elements).

Figure 2:
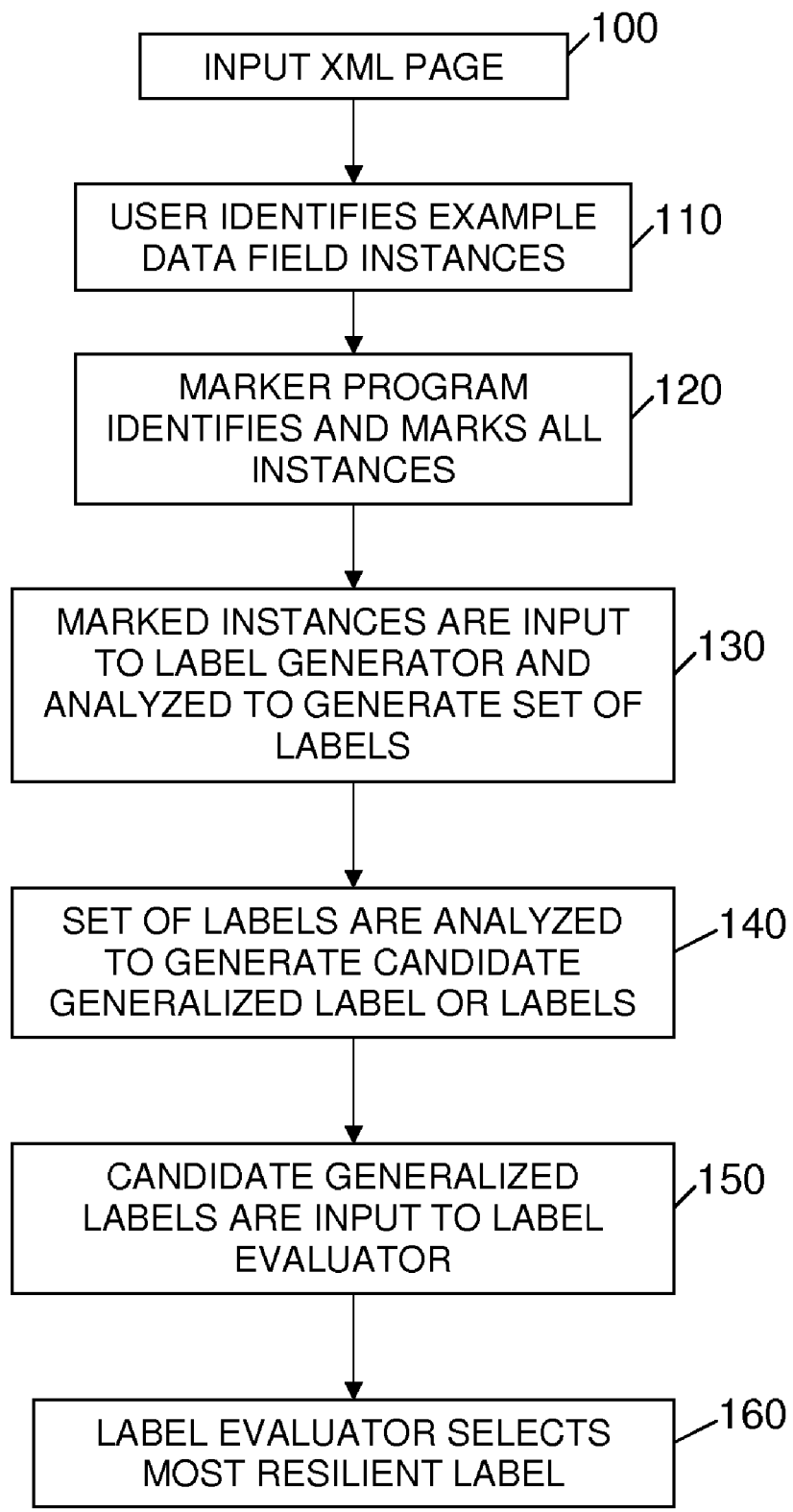
FIG. 2 shows the steps of a method according to an embodiment of the invention.

The components of a first data processing system implementing the invention are shown in FIG. 1. FIG. 2 shows the steps of a method implementing the invention.

Referring to FIG. 1, an application program 10 requires a resilient representative label for referencing instances of a specific data field within a set of XML pages 60. The application program 10 takes input XML pages and input from a user input device driver 70 (connected to an input device such as a keyboard 80 or mouse 90) and uses the services of a pre-processor 20 and label evaluator 50 to obtain a suitable resilient representative label. Such labels may be required for classification of the XML pages, such as for Website management, to enable subsequent extraction of data from the data field or for other applications.

The pre-processor 20 comprises an instance-marker program 30 and a label generator program 40. The marker program 30 marks all instances of a specific data field for subsequent processing. The label generator 40 includes an instance-specific-label generator 42 for generating a representative label for each instance of a specific data field, and a generalized-label generator 44 for generating at least one generalized representative label from the instance-specific labels. The generalized label or labels should be sufficiently generic to encompass all marked instances.

The generalized representative label (or a set of candidate representative labels) is input to the generalized label evaluator 50, which estimates each input generalized label's resilience to potential changes in the structure of the XML documents. The estimated resilience scores are used to validate or select a generalized representative label that satisfies predefined resilience requirements.

Referring to FIG. 2, the following pre-processing steps prepare the input data for evaluation of possible representative labels:

1. An XML page is input 100 (of FIG. 2) to the marker program 30 (of FIG. 1). The XML is parsed by the marker program which applies extraction rules to identify all instances of desired data fields, and these instances are marked 120 (of FIG. 2). Instances can be discovered and marked manually or semi-automatically. If necessary, the document may be pre-processed to replace poorly formed XML with well-formed XML (for example, where closing tags have been omitted or overlapping tags are not properly nested) to produce a document that can be mapped to a DOM tree.

In a first implementation of semi-automatic instance marking, the particular patterns of tokens and tags that are characteristic of desired data fields are learnt by the marker program 30 (of FIG. 1) through an analysis of a few example instances identified 110 (of FIG. 2) by an operator. The marker program then discovers 120 (of FIG. 2) the remaining instances using the learned patterns, and marks each instance. This marking may involve highlighting discovered instances of a data element in situ within the original document—such as using color coding that can be displayed to a user for validation. For example, if a user is interested in all tables with odd indices, then the first and third tables are typically sufficient to identify other such tables. As another example, a user may be interested in all odd links in the third table. If the identification step takes two input labels, such as /html[1]/table[3]/a[3] and /html[1]/table[3]/a[5], the identification may generate the generalized label /html[1]/table[3]/a[(position( )−1) mod 2=0]. This example is merely for illustrative purposes, since the generalization step depends on the label language.

In case a single document does not include all the data field instances to be covered, the marker program or user can mark the instances across different pages that belong to the same document class or template. These instances can then be collected and passed on to the next step in the process.

2. Each node in the XML DOM tree is assigned a unique label. This label is generated 130 (of FIG. 2) programmatically, using a label generator program or program subroutine 42 (of FIG. 1) which analyzes each marked instance provided by the marker program 30 (of FIG. 1). A constraint on this label generator program is that there is a unique, one-to-one correspondence between labels and the nodes in the XML DOM tree. This pre-processing step 130 (of FIG. 2) is referred to below as the instance-specific-label generation step.

Some example labeling schemes are set out below, and are illustrated by reference to the simple DOM tree 300 of FIG. 3:

A) Assign a (DOM-tree-level, index-in-the-level) pair to each node. For example, a node 320 (of FIG. 3) at depth 3 in the DOM tree, having 4 siblings to its left will be labeled (3,5). A node 310 of FIG. 3 at depth 3 with one sibling to its left will be labeled (3,2).

B) Choose the XPath® computer software expression language as labels. XPath® is a registered trademark of Brocade Communications Systems, Inc. San Jose, Calif., USA. Note that there are many possible XPath® computer software expression languages for a given node. For the purposes of this illustration, selection of the canonical XPath® computer software expression language will suffice. For example, node 310 (of FIG. 3) will be labeled /A[1]/B[1]/C[2] whereas node 320 (of FIG. 3) will be labeled /A[1]/B[2]/C[5].

As a result of the above process, a set of labels corresponding to all existing data-field instances is obtained.

3. The set of labels are then analyzed to generate 140 at least one generalized label that represents the set of labels for the set of instances of a specific data field. The generalized label belongs to either the same language as the labels of the set, or to an extension of that language. A constraint on the generalized label is that the generalized label encompasses (or 'matches') all members of the set of labels corresponding to data field instances.

For example, given three labels /html/body/table[2], /html/body/table[4], and /html/body/table[6], a generalized label could be /html/body/table[(position( )−2) mod 2=0].

Generalized labels can also be used, in some cases, to match data field instances that have not yet appeared on the Web page. Taking the previous example, an instance corresponding to the label /html/body/table[8] will match the generalized label. If there was a non-data element at the 8th position, a potential generalized label is /html/body/table[(position( )−2) mod 2=0 & position( ) <7]

Figure 3:
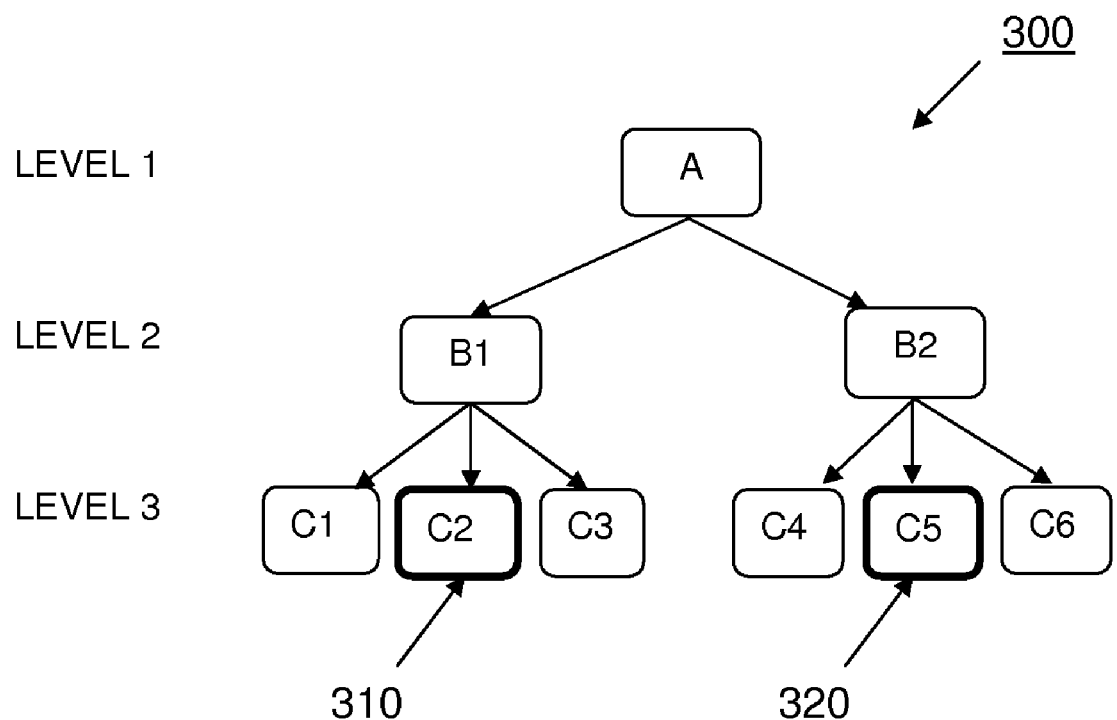
FIG. 3 shows an example DOM tree and example labelling schemes.

Referring to FIG. 3 and the example of (level, index) pairs, a possible generalized label representing nodes 310 (of FIG. 3) and 320 (of FIG. 3) is:

(3, (position( )−2)mod 3=0)

Possible generalized labels that each represent both nodes 310 (of FIG. 3) and 320 (of FIG. 3) using XPath® computer software expression languages are:

/A[1]/B[*]/C[2] and

/A[1]/*/C[5]

Depending on the grammar of the language used for label generation and the extent of generalization capabilities required, a variety of generalized labels are possible. In the present embodiment, the label generator program 40 (of FIG. 1) implements an algorithm for generating a set of possible generalized labels that each encompass the given set of data field instances. Patterns in the marked data-field locations can be exploited to generate the generalized labels. For instance, most data within a Web site is currently presented to users using dynamic pages. In this scenario, if the data is shown in the form of lists or tables, the underlying presentation program can be assumed to execute according to a 'for loop' construct (i.e. the presentation program is executed once for each instance of the data field—executing for one instance and then looping back to execute the next instance). Since a 'for loop' can be characterized by an initial index and an iteration step size, this characterization can be used to generate a generalized label (for example, (position( )−2) mod 2 captures the 'for loop' in the above example). In general, numerous generalized labels are possible for a given set of labels.

After the above-described pre-processing steps, a representation of the DOM tree, the set of individual labels, and the set of generalized labels are stored. If the document is static, then any one of the generalized labels is adequate to represent the data field (since the generation step ensures that each generalized label matches all of the marked instances of the data field, and can ensure compliance with any other requirements for static generalized representative labels). However, wherever there exists a possibility of changes to the structure of the XML pages, it may be necessary to discard non-resilient generalized labels (i.e. any labels that are likely to be invalidated by the changes) or to select the most resilient generalized label (to minimize the likelihood of labels becoming invalid).

Described below is a method to quantify the degree of resilience of a generalized representative label. The quantified degree of resilience is referred to below as the resilience score. The generalized label is input 150 (of FIG. 2) to the generalized label evaluator 50 (of FIG. 1), which estimates resilience to changes with reference to the resilience requirements for generalized representative labels. In the present embodiment, the evaluator 50 (of FIG. 1) compares resilience scores for a set of candidate generalized labels and then selects 160 (of FIG. 2) the label having the highest resilience score.

Generation of Generalized Labels

The methods outlined below can be used to generate 140 (of FIG. 2) candidate generalized labels for a given set of data instance labels:
1. Combining two or more instances into one generalized representation that encompasses each of the instances. This method can use operators such as position( ), *, mod, etc. For example, /table[2]/tr[1] and /table[4]/tr[3] can be represented as:

/table[(position( )-2)mod 2=0]/tr[(position( )-1)mod 2=0]

2. Removal of top k ancestors, while retaining last k elements. For example, /html[1]/body[1]/table[2]/tr[3]/ . . . / b[2]/a[1]/ becomes //*/b[2]/a[1]. Note that the label length changes when using this technique.
3. Ignoring top k ancestors but preserving the number of levels in the DOM tree represented within the label (referred to herein as preserving the label length). For example, /html[1]/body[1]/table[2]/tr[3]/ . . . /b[2]/a[1]/ becomes /*/*/*/tr[3]/ . . . /b[2]/a[1] (k=3).
4. If an instance has a particular position in the DOM tree relative to its siblings—such as being in the middle, or being last or first among its siblings—then mid( ), last( ), or first( ) operators can be used. For example, to refer to the third anchor tag of 5 siblings, . . . /A[mid( )] can be used as an alternative to . . . /A[3]
5. Ignoring indices but preserving tag names. For example, /html[1]/body[1]/table[2] becomes /html/body/table Not all of the above approaches are applicable to all labelling schemes. For example, a (level, index) labelling scheme can use approaches 1 and 4 above, but not approaches 2, 3 and 5.

Resilient Data Representation

FIGS. 1 and 2 show one possible system and method that use resilient data representations for data extraction or classification purposes. For classification, the resilient labels of relevant data fields can be used as features and any appropriate classification algorithm can be used to classify the documents. For data extraction, the required data fields can be accessed and extracted by using their resilient labels. Specific applications are discussed below, under the heading Applications.

Given a set of generalized representative labels, the present invention enables selection 160 (of FIG. 2) of the generalized representative label that appears to satisfy the following two requirements most successfully, even when small random changes are made to the page:
1. The generalized representative label continues to match the data fields on the page.
2. The generalized representative label is not so generic as to produce false positives—erroneously matching extraneous data.

If a generalized representative label satisfies the above requirements, the label is identified as a resilient representative label. The resilience need not be a Boolean property and can take any value between 0 and 1. The generalized label evaluator 50 within the system of FIG. 1 is used to compute the resilience score for each candidate representative label. The evaluator 50 outputs the label with the highest resilience score, for subsequent use by the application 10 (of FIG. 1).

The following notation is used in the remainder of this patent specification:
DOM refers to the tree model of the given document after conversion to an XML representation. DOM' refers to a changed version of the same document.
c refers to a single change (or a unit change) in a DOM tree-c can be one of the following two types:
1. Insertion of a leaf node in the DOM tree. This corresponds to a new data element being added to the page at a new location. Note that the case where new text is added to an existing node doesn't matter because the textual content of a node is irrelevant.
2. Deletion of a subtree.
d represents the 'depth' of the resilience (minimum degree of resilience) required by the user. A label will be called d-resilient if it is robust against any sequence of d consecutive changes to the underlying DOM tree, assuming that the data field instances are not removed because of these changes. As mentioned above, in some embodiments of the invention the number of consecutive changes to which a label is resilient may depend on the type of change and the particular form of label. For example, in XPath® computer software expression language, the label /html[1]/body[1]/ . . . /a[1] is susceptible to DOM tree deletions but the label //*/a[1] is not. Thus, differentiation between changes is handled on a label-level basis.
Ch(DOM, d) is a function that returns an exhaustive set of sequences of unit changes, each sequence of length d, such that every sequence is applicable to DOM. If d is 1 then there are roughly 2n possible singleton sequences of changes, where n is the number of nodes in DOM.Ch(DOM, d) may use different lengths ($d_1$, $d_2$, $d_3$) for different types of change.

Example pseudocode for Ch(DOM, 1), in which each output sequence has length 1, is as follows:

```
Set = { }
For each node n in DOM do
    Seq = { }
    For each possible node x do
        If x can be a child of n then
            Seq = Seq U {add-leaf(x, n)}
    end
    If n is not an ancestor of a data field instance then
        Seq = Seq U { delete-subtree(n) }
    Set = Set U Seq
end
return Set
```

While generating add-leaf changes, a check is performed of whether an arbitrary node x can be a child of n. This is desirable because, for example, only a TR (table row) can be a child of a TABLE. This check avoids the generation of spurious changes.

While generating delete-subtree changes, an ancestor check is performed to avoid deleting a genuine data field.

The pseudo-code for Ch(DOM, d) is more complex than this example, but is a natural extension of Ch(DOM, 1).

A function ApplyChange( ) changes the original DOM tree using one of the change sequences output by Ch(DOM, d).

Match(L,DOM) returns the set of nodes in DOM that are covered by the label L. Thus, L is robust to a change c if Match(L,DOM)=Match(L,DOM') where DOM' is the result of applying c to DOM. If L and L' are two labels and L' is more generic than L and covers all nodes matched by L (i.e. L' matches a superset of nodes matched by L), then there is no need to compute both Match(L',DOM) and to compute Match(L,DOM) over the whole DOM tree. Instead, Match(L,Match(L', DOM)) can be used to gain a significant reduction in processing time.

If nothing is known about a label language, Match( ) can be applied to each modified DOM tree. However, if the language is known, then various optimizations such as pointed out above can be used to significantly reduce computation time.

True(DOM) is the set of all nodes in the tree DOM that are instances of the data field of interest. Good(L, DOM) is the set of nodes in True(DOM) which can be matched by the label L on the tree DOM. Similarly, Bad(L,DOM) is the set of nodes not in True(DOM) that are matched by L on DOM. The bad nodes correspond to the set of false positives.

More formally, $$\text{Good}(L,DOM) = \text{True}(DOM) \cap \text{Match}(L,DOM) \quad (1)$$

$$\text{Bad}(L,DOM) = \text{Match}(L,DOM) \setminus \text{True}(DOM) \quad (2)$$

For a robust label L, Good(L,DOM) should be large and Bad(L,DOM) very small. For an ideal resilient representative label, Good(L,DOM)=True(L,DOM) and Bad(L,DOM) is an empty set. These conditions correspond to the two criteria described at the beginning of this section.

Two further metrics are defined as follows:

$$g(L) = |\text{Good}(L,DOM)|/|\text{True}(DOM)| \quad (3)$$

$$f(L) = |\text{Bad}(L,DOM)|/|\text{Match}(L,DOM)| \quad (4)$$

Note that both g(L) and f(L) lie between 0 and 1. g(L) and f(L) can be viewed as estimates of the probability of matching all genuine nodes and the probability of matching false positives, respectively.

Figure 4:
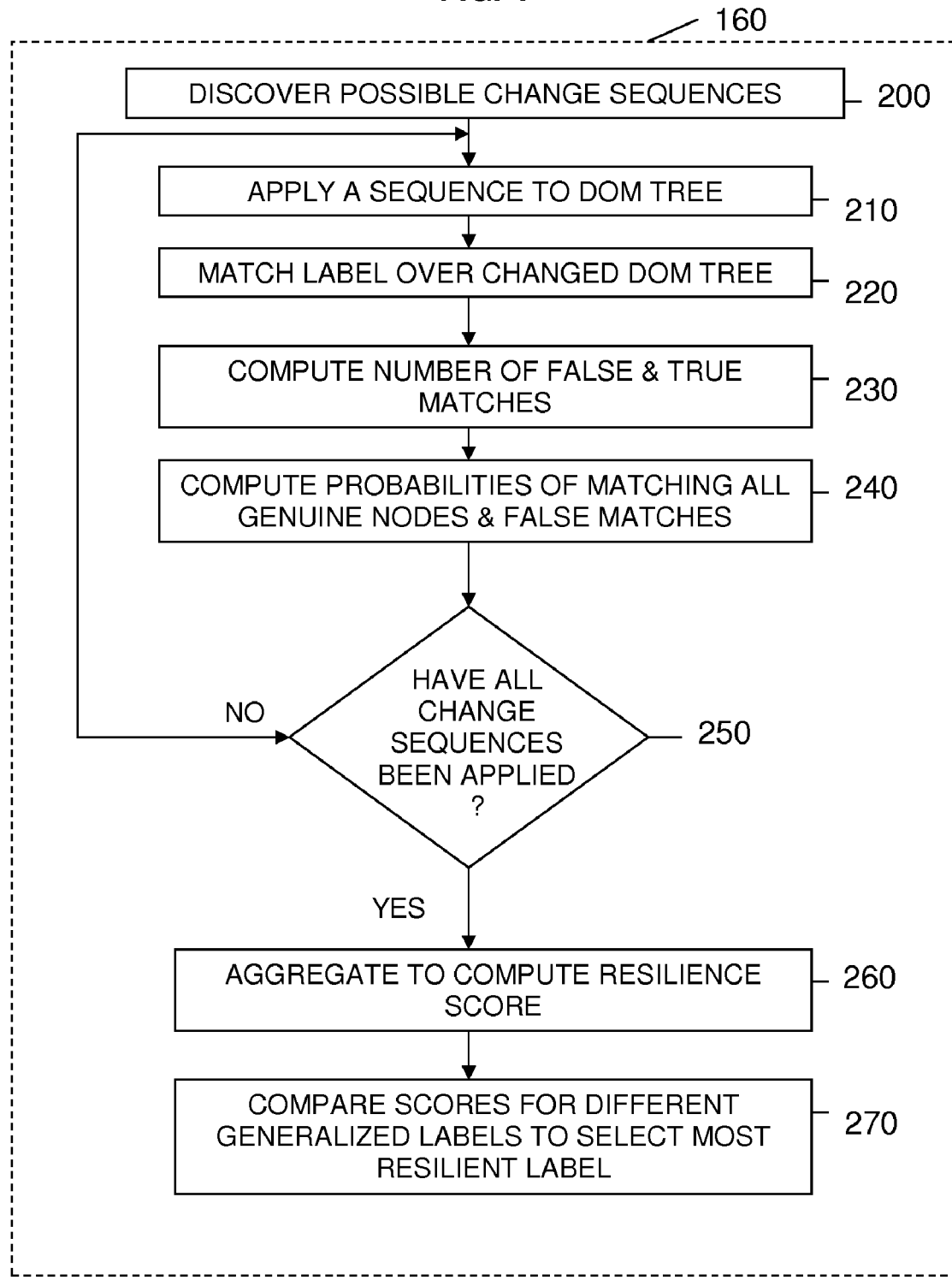
FIG. 4 shows an example method for performance by a generalized-label evaluator according to an embodiment of the invention.

Presented below, and shown in FIG. 4, is a scheme to identify the best d-resilient representative label for a given DOM (i.e. the generalized representative label with highest g(L) and lowest f(L)), out of a given set of generalized representative labels. Since the set of representative labels are produced by the label generator 40 (See FIG. 1) taking account of the requirement to match genuine nodes, they are assumed to encompass all genuine nodes in the given DOM tree.

Informally, the scheme computes g(L) and f(L) as follows:

Step 1: Discover 200 all possible change sequences of length d, for the tree DOM.

Step 2: For every change sequence
A) Apply 210 each sequence of changes to a fresh copy of DOM.
B) Match 220 the label L over the changed tree (say DOM')
C) Compute 230 the number of false and true positives amongst the matched nodes.
D) Compute 240 g(L) and f(L) for DOM' using Equations (3) and (4) above.

Step 3: When all change sequences have been applied 250, using an aggregate statistic (for example, the arithmetic mean for the set of change sequences) of the values obtained in step 2D, compute 260 the final values of g(L) and f(L).

A pseudo code representation for the above steps 1 to 3 for identifying a maximally-resilient generalized representative label is given below:

```
Function ComputeFG (DOM, L, d)
1.      C = Ch(DOM, d)
2.      T = True (DOM)
3.      Count = 0;
4.      For each Seq in C do
4.1         DOM' = DOM
4.2         For each change c in Seq do
4.2.1           DOM' = ApplyChange(DOM', c)
4.3         EndFor
4.4         M = Match(DOM', L)
4.5         Count = Count + 1
4.6         F[Count] = |Bad(L, DOM')| / |M|
4.7         G[Count] = |Good(L, DOM')| / |T|
4.8     EndFor
5.      f = mean(F); g = mean(G);
6       Return (f, g)
End Function
```

The algorithm underlying the pseudo-code above can be modified in many ways to reduce processing time, or to tune the algorithm for specific applications. Some possible variations are:

A) In step 1, instead of taking all possible changes to the DOM tree, a subset of important changes can be considered. Since not every potential change affects the label, the function Ch( ) can be written to output only those changes that affect the representative label L.

B) In step 4.4, instead of repeatedly matching the representative label L over the whole DOM tree, a caching strategy can be employed, which incrementally constructs the set of matched nodes.

C) In steps 4.6 and 4.7, the quantities can be premultiplied by some weights, which means that a higher (or lower) weight is given to that particular sequence of changes. For example, weightings may be applied to different types of changes according to the likelihood of occurrence of changes of those types. This likelihood may be determined by analysis of historical data showing frequencies of certain types of change.

D) In step 5, an alternative aggregate statistical function can be substituted instead of the mean.

Resilience Score

The resilience score S(L) can be computed 260 by combining g(L) and f(L). The exact combination depends on the demands of the application. Two alternative examples of possible combinations are:

$$S(L) = u.g(L) + v(1-f(L)) \text{ and}$$

$$S(L) = g(L)^u . (1-f(L))^v$$

where u and v are suitably normalized weights. The value of u is high when the application demands high accuracy and v is high when false positives cannot be tolerated.

The system then compares 270 resilience scores for different candidate generalized representative labels and outputs the representative label with the highest resilience score. This most resilient of all the generalized representative labels is used by the application program for subsequent classification, extraction or other applications.

Applications

Resilient representative labels can be used in a variety of applications. Two of these applications—extraction and classification/clustering—are described below. For the sake of simplicity, XPath® computer software expression language is assumed to be the language used for label generation.

Extraction

A typical data extraction (or 'wrapping') process for Web page data involves cleaning and parsing an HTML document to produce a well-formed document that can be mapped to a DOM tree. Extraction rules are typically expressed using a high-level extraction language. The extraction rules typically express a navigation path through the tree, using representative labels based on the Web page structure to specify which pieces of information to collect. The extracted structured information can then be transferred into other forms (such as HTML to XML, database objects or program components). The extraction of structured data from semi-structured Web pages may use the above-described method to obtain and validate suitable representative labels for use by extraction algorithms applying the extraction rules.

Most of the useful information in a Website is contained in dynamic pages. Further, the following two broad observations can be made regarding dynamic pages:

1. A handful of templates are used to generate numerous dynamic pages. These templates correspond to the skeletal structure of the DOM tree. Content is then added to this structure to turn it into a presentable Web page. Dynamic pages that share the same template also display corresponding information in the same regions of the Web page. Hence the same representative labels can be used to describe the data fields in different dynamic pages that use the same template.

When any changes are made to the underlying template, all the dynamic pages that are derived from this template exhibit the same change in their structure. By using the most resilient label, there is an increased likelihood that such changes will be handled automatically for all the pages of this template. Thus, resilient labels offer a change-tolerant mechanism to extract data from not just one page, but a family of dynamic pages.

2. Dynamic pages are typically generated using a few program constructs—and the 'for loop' and 'if-then-else' constructs are the most important of these constructs. These constructs can be easily simulated in some languages such as XPath® computer software expression language. For example, '(position( )-x) mod y' can simulate for loops.

This results in a compact representation of repetitive and optional data. As mentioned above, a graphical user interface can be used to generate the candidate representative lables semi-automatically.

It follows that the user can easily generate the resilient labels using a few pages and then evaluate them on a bigger set of pages to extract data without worrying about small changes to the page.

Template Clustering/Classification

The problem of template clustering deals with grouping pages which have similar look and feel. Pages with the same look and feel have almost the same structure and differ only in the content present at the leaf nodes. Consequently, the representative labels for data fields in two such pages will be almost identical. Thus, resilient label can serve as a compact feature representing the page.

The 'distance' between two resilient labels can be used as the metric and standard clustering algorithms can then be used. The possible distance metric depends on the language used for label generation.

The above description of example embodiments and applications of the invention discloses methods for determining a resilient representation of data elements of interest in semi-structured data. A two-step approach is disclosed for identifying a resilient representative label for the desired data, from a set of candidate representative labels. In the first step, two probabilities are estimated for each given representative label—the probability that the representative label will match genuine nodes and the probability that the representative label will match false positives. In the second step, the two estimated probabilities are combined using an application-specific measure to obtain a resilience score for each of the candidate representative labels. The label with the highest score is chosen to represent that particular data field.

In alternative embodiments of the invention, a number of resilient representative labels may be selected—perhaps the two or three labels having the highest computed resilience scores. If a plurality of different resilient labels are based on different characteristics of the input XML pages, one label may be the most resilient to one type of change whereas another label may be the most resilient to a different type of change. Therefore, use of a plurality of different types of labels may ensure greater resilience (for example, increased assurance that all instances of a data element can be extracted despite structural changes to the semi-structured document) than can be achieved by any one label alone. Any data elements that match required resilience criteria for only some of a selected plurality of generalized representative labels may be flagged for manual checking by a user.

In other embodiments of the invention, the 'selection' of a set of (one or more) generalized representative labels by the generalized label evaluator 50 (of FIG. 1) comprises a validation step. That is, a determination is performed of which of a set of generalized representative labels satisfies a required minimum resilience score. Any one or more of the labels that satisfy the requirement may be selected as valid, whereas any labels that do not satisfy the requirement are discarded.

What is claimed is:

1. A method to extract data from a plurality of semi-structured data sources, said method comprising:
   parsing a semi-structured data source to produce a well-formed document that is mapped to a Document Object Model (DOM) tree;
   generating a respective representative label for each of a set of identified instances of a data element within said semi-structured data source;
   generating a generalized representative label that matches each of the representative labels generated for the identified, instances;
   evaluating a resilience of the generalized representative label to structural changes of the semi-structured data source by estimating, for a set of possible structural changes to the semi-structured data source, a probability of the generalized representative label satisfying a set of resilience criteria; and storing the evaluated resilience of the generalized representative label, wherein the resilience of a label is evaluated with respect to a known change model that is learned from a history of previous changes to said semi-structured data source, wherein said evaluating comprises evaluating the resilience against a selection criterion by:

comparing a calculated degree of resilience for the generalized representative label with a calculated degree of resilience of another generalized representative label; and selecting the generalized representative label having a highest calculated degree of resilience, wherein said estimating occurs by determining a probability that said respective representative label will match nodes of interest in said DOM tree and determining a probability that said respective representative label will match nodes not of interest in said DOM tree, and wherein said resilience of the generalized representative label is used as a measure to extract data from said plurality of semi-structured data sources.

2. The method of claim 1, wherein said evaluating comprises estimating probabilities of satisfying the set of resilience criteria for each of the set of possible structural changes and aggregating the estimated probabilities for the set of possible structural changes.

3. The method of claim 1, wherein the set of resilience criteria comprises a first criterion that the generalized representative label matches all instances of the data element and a second criterion that the generalized representative label does not match extraneous data that is not an instance of the data element.

4. The method of claim 1, wherein said evaluating further comprises computing a weighted combination of probabilities of the generalized representative label satisfying each of a plurality of resilience criteria.

5. The method of claim 1, wherein said evaluating further comprises:

estimating, for each of the set of possible structural changes, the probability of the generalized representative label matching all instances of the data element;

estimating, for each of the set of possible structural changes, the probability of the generalized representative label matching extraneous data that is not an instance of the data element;

aggregating said estimated probability of matching all instances of the data element, for the set of possible structural changes;

aggregating said estimated probability of matching extraneous data, for the set of possible structural changes; and combining said aggregated probability of matching all instances of the data element with said aggregated probability of matching extraneous data, to calculate a value representing a degree of resilience to possible structural changes.

6. The method of claim 1, wherein said plurality of semi-structured data sources comprises web pages.

7. The method of claim 6, wherein said plurality of semi-structured data sources comprises a document written in any meta-language that is a variant of Standard Generalized Markup Language (SGML).

8. The method of claim 1, further comprising selecting at least two generalized representative labels having a highest calculated degree of resilience.

9. The method of claim 1, wherein said evaluating comprises comparing said estimated probability with a threshold minimum required probability of satisfying the set of resilience criteria.

10. The method of claim 1, further comprising:

analyzing records of changes to a semi-structured data source to determine a set of possible structural changes to the semi-structured data source.

11. A method to classify data from a plurality of semi-structured data sources, said method comprising:

parsing a semi-structured data source to produce a well-formed document that is mapped to a Document Object Model (DOM) tree;

for a set of candidate generalized representative labels that each represent a set of instances of a data element, estimating a probability of each respective candidate generalized representative label satisfying a set of resilience criteria following potential structural changes to the semi-structured data source, wherein a resilience of a label is evaluated with respect to a known change model that is learned from a history of previous changes to said semi-structured data source;

comparing the estimated probabilities to identify a generalized representative label having a highest probability of satisfying the set of resilience criteria;

selecting the identified generalized representative lable; and storing the selected identified generalized representative label, wherein said estimating occurs by determining a probability that said respective candidate generalized label will match nodes of interest in said DOM tree and determining a probability that said respective candidate generalized label will match nodes not of interest in said DOM tree, and wherein said Identified generalized representative label is used as a measure to classify data from said plurality of semi-structured data sources.

12. A method to cluster data from a plurality of semi-structured data sources, said method comprising:

parsing a semi-structured data source to produce a well-formed document that is mapped to a Document Object Model (DOM) tree;

generating a respective representative label for each of a set of identified instances of a data element within said semi-structured data source;

generating a generalized representative label that matches each of the representative labels generated for the identified instances;

evaluating a resilience of the generalized representative label to structural changes of the semi-structured data source by estimating, for a set of possible structural changes to the semi-structured data source, a probability of the generalized representative label satisfying a set of resilience criteria; and storing the evaluated resilience of the generalized representative label, wherein the resilience of a label is evaluated with respect to a known change model that is learned from a history of previous changes to said semi-structured data source, wherein said estimating occurs by determining a probability that said respective representative label will match nodes of interest in said DOM tree and determining a probability that said respective representative label will match nodes not of interest in said DOM tree, and wherein said resilience of the generalized representative label is used as a measure to cluster data from said plurality of semi-structured data sources.

13. A method for extraction of data elements from a semi-structured data source, said method comprising:

parsing said semi-structured data source to produce a well-formed document that is mapped to a Document Object Model (DOM) tree;

for at least one candidate representative label for representing data elements within the data source, evaluating resilience of the candidate representative label to structural changes of the data source by estimating, for a set of possible structural changes to the data source, a probability of the candidate representative label satisfying a set of resilience criteria; wherein the resilience of a label is evaluated with respect to a known change model that is learned from a history of previous changes to said semi-structured data source, wherein said estimating occurs by determining a probability that said candidate representative label will match nodes of interest in said DOM tree and determining a probability that said candidate representative label will match nodes not of interest in said DOM tree, selecting a representative label based on the estimated probability of satisfying the set of resilience criteria;

storing the representative label; and executing a data extraction rule using the selected representative label to specify data to be extracted, wherein a resilience of said selected representative label is used as a measure to extract data from said plurality of semi-structured data sources.

14. The method of claim 13, wherein said plurality of semi-structured data sources comprises web pages.

15. A program storage device readable by computer, embodying a program of instructions executable by said computer to perform a method to extract data from a plurality of semi-structured data sources, said method comprising:

parsing a semi-structured data source to produce a well-formed document that is mapped to a Document Object Model (DOM) tree;

generating a respective representative label for each of a set of identified instances of a data element within said semi-structured data source;

generating a generalized representative label that matches each of the representative labels generated for the identified instances;

evaluating a resilience of the generalized representative label to structural changes of the semi-structured data source by estimating, for a set of possible structural changes to the semi-structured data source, a probability of the generalized representative label satisfying a set of resilience criteria; and storing the evaluated resilience of the generalized representative label, wherein the resilience of a label is evaluated with respect to a known change model that is learned from a history of previous changes to said semi-structured data source, wherein said evaluating comprises evaluating the resilience against a selection criterion by:

comparing a calculated degree of resilience for the generalized representative label with a calculated degree of resilience of another generalized representative label; and selecting the generalized representative label having a highest calculated degree of resilience, wherein said estimating occurs by determining a probability that said respective representative label will match nodes of interest in said DOM tree and determining a probability that said respective representative label will match nodes not of interest in said DOM tree, and wherein said resilience of the generalized representative label is used as a measure to extract data from said plurality of semi-structured data sources.

16. A program storage device readable by computer, embodying a program of instructions executable by said computer to perform a method to classify data from a plurality of semi-structured data sources, said method comprising:

parsing a semi-structured data source to produce a well-formed document that is mapped to a Document Object Model (DOM) tree;

generating a respective representative label for each of a set of identified instances of a data element within said semi-structured data source;

generating a generalized representative label that matches each of the representative labels generated for the identified instances; and evaluating a resilience of the generalized representative label to structural changes of the semi-structured data source by estimating, for a set of possible structural changes to the semi-structured data source, a probability of the generalized representative label satisfying a set of resilience criteria; and storing the evaluated resilience of the generalized representative label, wherein the resilience of a label is evaluated with respect to a known change model that is learned from a history of previous changes to said semi-structured data source, wherein said evaluating comprises evaluating the resilience against a selection criterion by:

comparing a calculated degree of resilience for the generalized representative label with a calculated degree of resilience of another generalized representative label; and selecting the generalized representative label having a highest calculated degree of resilience, wherein said estimating occurs by determining a probability that said respective representative label will match nodes of interest in said DOM tree and determining a probability that said respective representative label will match nodes not of interest in said DOM tree, and wherein said resilience of the generalized representative label is used as a measure to classify data from said plurality of semi-structured data sources.

17. A program storage device readable by computer, embodying a program of instructions executable by said computer to perform a method to cluster data from a plurality of semi-structured data sources, said method comprising:

parsing a semi-structured data source to produce a well-formed document that is mapped to a Document Object Model (DOM) tree;

generating a respective representative label for each of a set of identified instances of a data element within said semi-structured data source;

generating a generalized representative label that matches each of the representative labels generated for the identified instances; and evaluating a resilience of the generalized representative label to structural changes of the semi-structured data source by estimating, for a set of possible structural changes to the semi-structured data source, a probability of the generalized representative label satisfying a set of resilience criteria; and storing the evaluated resilience of the generalized representative label, wherein the resilience of a label is evaluated with respect to a known change model that is learned from a history of previous changes to said semi-structured data source, wherein said evaluating comprises evaluating the resilience against a selection criterion by:

comparing a calculated degree of resilience for the generalized representative label with a calculated degree of resilience of another generalized representative label; and selecting the generalized representative label having a highest calculated degree of resilience, wherein said estimating occurs by determining a probability that said respective representative label will match nodes of interest in said DOM tree and determining a probability that said respective representative label will match nodes not of interest in said DOM tree, and wherein said resilience of the generalized representative label is used as a measure to cluster data from said plurality of semi-structured data sources.

18. A data processing apparatus configured to extract data from a plurality of semi-structured data sources, the apparatus comprising:

a data processing unit;

a data storage unit operatively connected to said data processing unit;

a marker program comprising computer-executable instructions configured to parse a semi-structured data source to produce a well-formed document that is mapped to a Document Object Model (DOM) tree;

a label generator adapted configured to generate a respective representative label for each of a set of identified instances of a data element within a semi-structured data source, and to generate a generalized representative label that matches each of the representative labels generated for the identified instances;

an evaluator configured to evaluate a resilience of the generalized representative label to structural changes of the semi-structured data source by estimating, for a set of possible structural changes to the semi-structured data source, a probability of the generalized representative label satisfying a set of resilience criteria; and a storage device configured to store the evaluated resilience of the generalized representative label, wherein the resilience of a label is evaluated with respect to a known change model that is learned from a history of previous changes to said semi-structured data source, wherein said evaluator is further configured to evaluate the resilience against a selection criterion by:

comparing a calculated degree of resilience for the generalized representative label with a calculated degree of resilience of another generalized representative label; and selecting the generalized representative label having a highest calculated degree of resilience, wherein said estimating occurs by determining a probability that said respective representative label will match nodes of interest in said DOM tree and determining a probability that said respective representative label will match nodes not of interest in said DOM tree, and wherein said resilience of the generalized representative label is used as a measure to extract data from said plurality of semi-structured data sources.

19. The apparatus of claim 18, wherein said plurality of semi-structured data sources comprises web pages.

20. A data processing apparatus configured to classify data from a plurality of semi-structured data sources, the apparatus comprising:

a data processing unit;

a data storage unit operatively connected to said data processing unit;

a marker program comprising computer-executable instructions configured to parse a semi-structured data source to produce a well-formed document that is mapped to a Document Object Model (DOM) tree;

a label generator adapted configured to generate a respective representative label for each of a set of identified instances of a data element within a semi-structured data source, and to generate a generalized representative label that matches each of the representative labels generated for the identified instances; and an evaluator adapted configured to evaluate a resilience of the generalized representative label to structural changes of the semi-structured data source by estimating, for a set of possible structural changes to the semi-structured data source, a probability of the generalized representative label satisfying a set of resilience criteria; and a storage device configured to store the evaluated resilience of the generalized representative label, wherein the resilience of a label is evaluated with respect to a known change model that is learned from a history of previous changes to said semi-structured data source, wherein said evaluator is further configured to evaluate the resilience against a selection criterion by:

comparing a calculated degree of resilience for the generalized representative label with a calculated degree of resilience of another generalized representative label; and selecting the generalized representative label having a highest calculated degree of resilience, wherein said estimating occurs by determining a probability that said respective representative label will match nodes of interest in said DOM tree and determining a probability that said respective representative label will match nodes not of interest in said DOM tree, and wherein said resilience of the generalized representative label is used as a measure to classify data from said plurality of semi-structured data sources.

21. A data processing apparatus configured to cluster data from a plurality of semi-structured data sources, the apparatus comprising:

a data processing unit;

a data storage unit operatively connected to said data processing unit;

a marker program comprising computer-executable instructions configured to parse a semi-structured data source to produce a well-formed document that is mapped to a Document Object Model (DOM) tree;

a label generator configured to generate a respective representative label for each of a set of identified instances of a data element within a semi-structured data source, and to generate a generalized representative label that matches each of the representative labels generated for the identified instances; and an evaluator configured to evaluate a resilience of the generalized representative label to structural changes of the semi-structured data source by estimating, for a set of possible structural changes to the semi-structured data source, a probability of the generalized representative label satisfying a set of resilience criteria; and a storage device configured to store the evaluated resilience of the generalized representative label, wherein the resilience of a label is evaluated with respect to a known change model that is learned from a history of previous changes to said semi-structured data source, wherein said evaluator is further configured to evaluate the resilience against a selection criterion by:

comparing a calculated degree of resilience for the generalized representative label with a calculated degree of resilience of another generalized representative label; and selecting the generalized representative label having a highest calculated degree of resilience, wherein said estimating occurs by determining a probability that said respective representative label will match nodes of interest in said DOM tree and determining a probability that said respective representative label will match nodes not of interest in said DOM tree, and wherein said resilience of the generalized representative label is used as a measure to cluster data from said plurality of semi-structured data sources.

* * * * *